United States Patent [19]
Edahiro

[11] Patent Number: 5,293,953
[45] Date of Patent: Mar. 15, 1994

[54] REAR WHEEL STEERING SYSTEM FOR A VEHICLE

[75] Inventor: Takeshi Edahiro, Hiroshima, Japan

[73] Assignee: Mazda Motor Corporation, Hiroshima, Japan

[21] Appl. No.: 918,119

[22] Filed: Jul. 22, 1992

Related U.S. Application Data

[63] Continuation of Ser. No. 784,109, Oct. 29, 1991, abandoned, which is a continuation of Ser. No. 545,588, Jun. 29, 1990, abandoned.

[30] Foreign Application Priority Data

Jun. 30, 1989 [JP] Japan .................................. 1-169088

[51] Int. Cl.$^5$ .............................................. B62D 5/06
[52] U.S. Cl. ...................................... 180/132; 180/140; 180/141
[58] Field of Search ........................ 180/132, 140–143; 280/91; 364/424.05

[56] References Cited

U.S. PATENT DOCUMENTS

| | | | |
|---|---|---|---|
| 4,657,102 | 4/1987 | Kanazawa et al. | 180/140 |
| 4,770,264 | 9/1988 | Wright et al. | 180/140 |
| 4,896,737 | 1/1990 | Kanazuma et al. | 180/140 |
| 4,953,652 | 9/1990 | Ohmura et al. | 180/140 |
| 5,060,743 | 10/1991 | Oda et al. | 280/91 |

FOREIGN PATENT DOCUMENTS

| | | | |
|---|---|---|---|
| 0092980 | 5/1985 | Japan | 180/140 |
| 0008074 | 1/1988 | Japan | 180/140 |
| 0255181 | 10/1988 | Japan | 180/140 |
| 0009080 | 1/1989 | Japan | 180/140 |
| 0101269 | 4/1989 | Japan | 180/140 |
| 0119473 | 5/1989 | Japan | 180/141 |

OTHER PUBLICATIONS

Copy of Japanese Patent Unexamined Publication No. 152,977/1987.

*Primary Examiner*—David M. Mitchell
*Assistant Examiner*—Paul Dickson
*Attorney, Agent, or Firm*—Fish & Richardson

[57] ABSTRACT

A rear wheel steering system is disposed in a rear wheel steering mechanism and has a power cylinder for generating a power for steering the rear wheels in response to a liquid pressure. The power cylinder is connected to a pump as a source of generating the liquid pressure through a high pressure passage and further to a reservoir tank through a low pressure passage. The high pressure passage is connected to the low pressure passage through a relief passage on the pump side and a relief passage on the power cylinder side, the relief passages being disposed in parallel to each other. The rear wheel steering system is provided with a passage shifting system for closing the relief passages during stationary period of time while opening each of the relief passages during operation and dividing the high pressure passage between the relief passages into sections and with a narrowed passage portion disposed at the relief passage on the power cylinder side. Operation of the passage shifting system independently allows the high pressure passage on the pump side and the high pressure passage on the power cylinder side to be communicated with the low pressure passage. At this time, the liquid pressure from the power cylinder is gradually released by the action of the narrowed passage portion. The liquid pressure withdrawn from the pump is rapidly released to the low pressure passage without interference with the narrowed passage portion.

15 Claims, 6 Drawing Sheets

REAR WHEEL STEERING SYSTEM FOR A VEHICLE

This application is a continuation of U.S. application Ser. No. 07/784,109, filed Oct. 29, 1991, now abandoned; which is a continuation of Ser. No. 07/545,588, filed Jun. 29, 1990, now abandoned.

BACKGROUND OF THE INVENTION

1. Field of the Invention

The present invention relates to a rear wheel steering system for a vehicle for steering the rear wheels together with the front wheels.

2. Description of Related Art

Japanese Patent Unexamined Publication (kokai) No. 152,977/1987 discloses a rear wheel steering system for a vehicle, in which its rear wheel steering mechanism is provided with a power steering unit which has a power cylinder for generating a power for steering the rear wheels in response to a liquid pressure, the power cylinder being connected through a high pressure passage to a pump as a source of generating the liquid pressure as well as through a low pressure passage to a reservoir tank. From the viewpoint of a fail safe, this system is provided with a spring for biasing the rear wheels toward the neutral position as well as with a fail valve which communicates the liquid chambers in the power cylinder with each other for placing the power cylinder in its neutral position. The pump for the power steering unit is always driven during operation of the engine, so that this pump tries to keep supplying the liquid pressure to the power cylinder even at the time of a fail.

In order to ensure a fail safe, demands have been made to release the liquid pressure in the power cylinder while keeping a supply of no liquid pressure to the power cylinder from the pump for the power steering unit. From this point of view, it is considered that a relief passage is separately disposed so as to communicate the high pressure passage with the low pressure passage and that a fail valve is disposed on the relief passage, the fail valve being made to open at the fail time.

It is further desired that the power cylinder is allowed to gradually release the liquid pressure as slow as possible in order to prevent the rear wheels from steering to the neutral position. At this time, the relief passage is provided with a restrictor. The position of this restrictor, however, may suffer from the disadvantage that the liquid pressure would not be released from the pump to the low pressure passage to a sufficient extent due to the action of the restrictor, thereby suppressing a release of the liquid pressure from the power cylinder.

SUMMARY OF THE INVENTION

The object of the present invention is to provide a rear wheel steering system for a vehicle adapted to gradually release a liquid pressure from the power cylinder through the high pressure passage without exerting any influence upon the liquid pressure to be withdrawn from the pump.

In order to achieve the object, the present invention consists of a rear wheel steering system for a vehicle, comprising a power cylinder disposed to a rear wheel steering mechanism for generating a power for steering rear wheels in response to a liquid pressure;

wherein the power cylinder is connected through a high pressure passage to a pump as a source of generating the liquid pressure and through a low pressure passage to a reservoir tank;

the high pressure passage is connected to the low pressure passage through a relief passage on the pump side and a relief passage on the power cylinder side, the relief passage on the pump side being disposed in parallel to the relief passage on the power cylinder side;

a passage shifting means for opening each of the relief passage on the pump side and the relief passage on the power cylinder side during operation, which otherwise are closed, and for dividing the high pressure passage between the relief passage on the pump side and the relief passage on the power cylinder side; and the relief passage on the power cylinder side is provided with a restrictor.

This arrangement enables the liquid pressure to be released to the low pressure passage and eventually to the reservoir tank by dividing the high pressure passage into the high pressure passages on the pump side and on the power cylinder side due to operation of a shift valve. In this case, the action of the restrictor disposed to the relief passage on the power cylinder side allows the liquid pressure to be gradually released from the power cylinder, thereby preventing the rear wheels from rapidly steering. The liquid pressure discharged from the pump is rapidly released into the low pressure passage through the relief passage on the pump side without interference with the restrictor.

While the liquid pressure is released from the pump to the low pressure passage without delay, a release of the liquid pressure from the power cylinder is not impaired by the liquid pressure discharged from the pump because the high pressure passage between the two relief passages is divided. Therefore, the present invention ensures a gradual release of the liquid pressure from the power cylinder at the time of a fail or the like, while the liquid pressure is released without delay from the pump.

Other objects, features and advantages of the present invention will become apparent in the course of the description of the preferred embodiments, which follows, in conjunction with the accompanying drawings.

BRIEF DESCRIPTION OF THE DRAWINGS

FIGS. 7-10 are views showing other embodiments of the present invention, in which:

FIG. 7 is an abbreviated view of the circuit;

FIG. 8 is a view showing the equivalent circuit in the state of FIG. 10; and

FIGS. 9 and 10 are views in section showing a mechanism for shifting the hydraulic circuit.

DETAILED DESCRIPTION OF THE PREFERRED EMBODIMENTS

The present invention will be described more in detail by way of examples in conjunction with the accompanying drawings.

Figure 1:
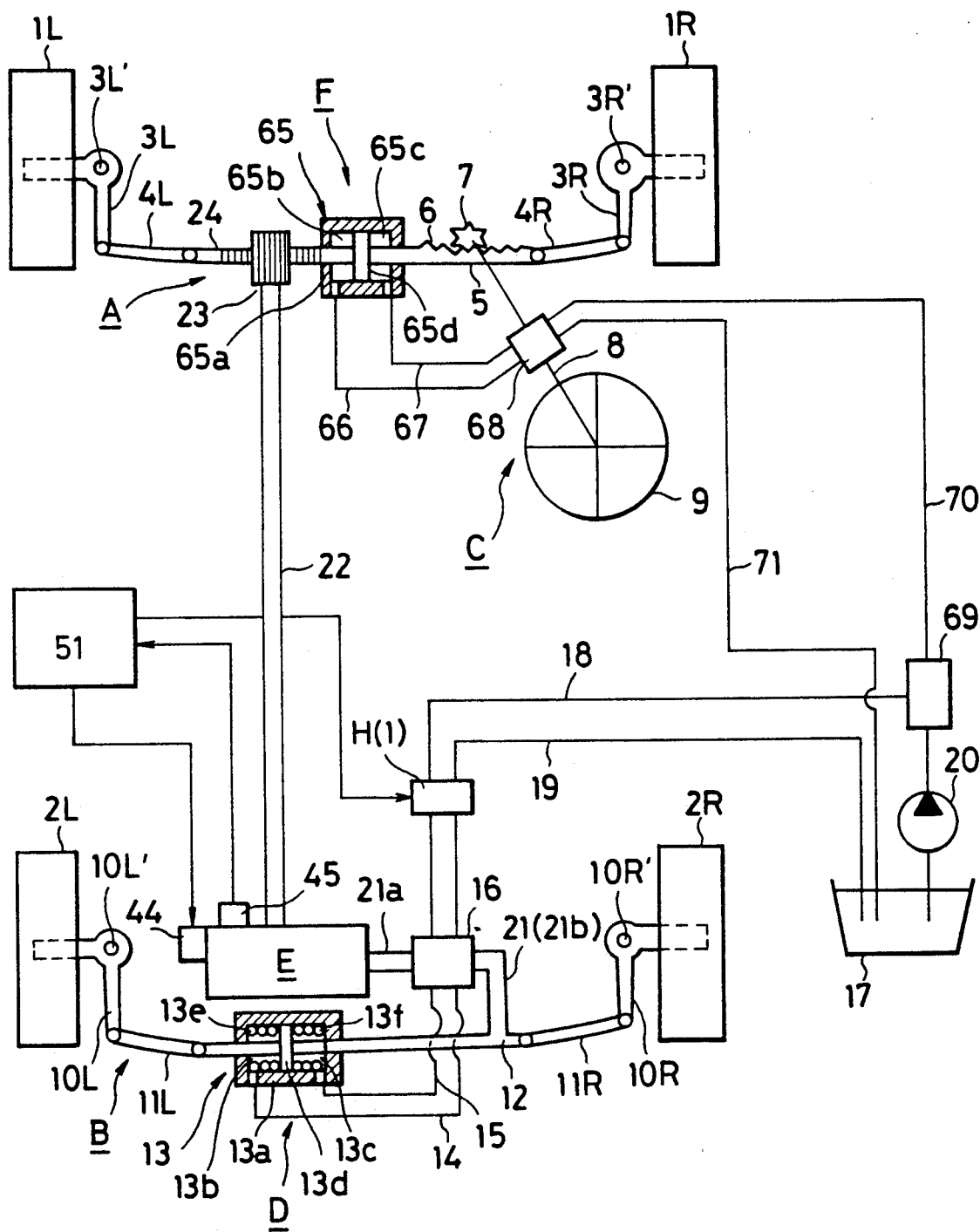
FIG. 1 is a schematic diagram showing an outline of a rear wheel steering system according to an embodiment of the present invention.

As shown in FIG. 1, a right-hand front wheel 1R and a left-hand front wheel 1L are associated with a front wheel steering mechanism A while a right-hand rear wheel 2R and a left-hand rear wheel 2L are associated with a rear wheel steering mechanism B.

In this embodiment, the front wheel steering mechanism A comprises a left-hand knuckle arm 3L and a right-hand knuckle arm 3R, a right-hand tie rod 4R and a left-hand tie rod 4L, and a relay rod 5 connecting the right-hand tie rod 4R to the left-hand tie rod 4L. To the front wheel steering mechanism A is connected a steering mechanism C which is of a rack-and-pinion type in this embodiment. More specifically, the relay rod 5 is provided with a rack 6, and a pinion 7 engageable with the rack 6 is connected through a shaft 8 to a steering wheel 9. This structure allows the relay rod 5 to be displaced to the left in FIG. 1 when the steering wheel 9 is steered to the right, pivoting the knuckle arms 3R and 3L about the respective pivot centers 3R' and 3L' in accordance with an amount of displacement by operation of the steering wheel 9, i.e., a steered angle of the steering wheel 9, and eventually resulting in steering the right-hand and left-hand front wheels 1R and 1L to the right. Likewise, when the steering wheel 9 is steered to the left, the right-hand and left-hand front wheels 1R and 1L, respectively, are steered to the left in accordance with an amount of displacement by operation of the steering wheel 9.

Like the front wheel steering mechanism A, the rear wheel steering mechanism B comprises a right-hand and left-hand knuckle arm 10R and 10L and a right-hand and left-hand tie rod 11R and 11L, respectively, and a relay rod 12 connecting the right-hand tie rod 11R to the left-hand tie rod 11L, and it is provided with a power steering mechanism D of a hydraulic pressure type.

Figure 2:
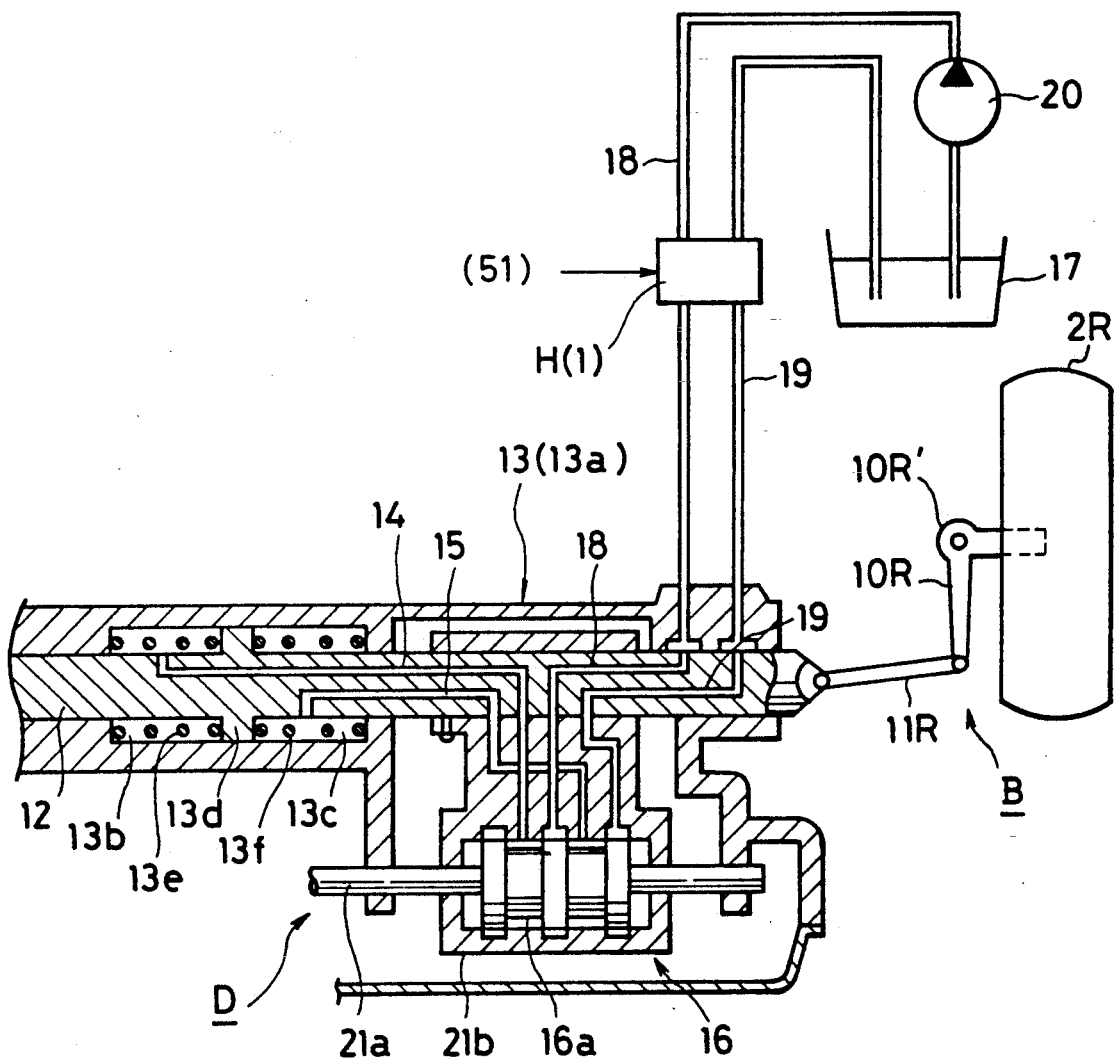
FIG. 2 is a schematic diagram in section showing detail of a power steering unit for a rear wheel.

The power steering mechanism D will be described with reference to FIG. 2. A relay rod 12 is provided with a power cylinder 13 whose main body 13a is fixed to the vehicle body. The main body 13a of the cylinder 13 is divided into two chambers 34b and 13c by a piston 13d which is integral with the relay rod 12. The two chambers 13b and 13c within the cylinder 13a are communicated respectively with a control valve 16 through pipes 14 and 15. To the control valve 16 are connected pipes 18 and 19 extending from a reservoir tank 17. To the pipe 18 is connected an oil pump 20 that is drivable by an engine (not shown). The pipe 18 constitutes a high pressure passage, while the pipe 19 constitutes a low pressure passage.

The control valve 16 has a spool 16a, and a control rod 21 of the control valve 16 is of a so-called booster valve type which is of a sliding type. The control rod 21 has an input section 21a integral with the spool 16a, which is also used as a transferal member for a steering ratio altering system E (as shown in Japanese Patent Unexamined Publication (kokai) No. 152,977/1987), while an output section 21b of the control rod 21 is disposed integrally with the relay rod 12 of the rear wheel steering mechanism B.

For the power steering mechanism D, as is known in the art, as the control rod 21 is displaced in the left direction in FIG. 1, the relay rod 12 is displaced in the left direction in FIG. 1, thereby pivoting the knuckle arms 10R and 10L about their respective pivot centers 10R' and 10L' in the clockwise direction in FIG. 1 and steering the rear wheels 2R and 2L to the right.

In steering, a liquid pressure is supplied to the chamber 13b of the power cylinder 13 in accordance with an amount of displacement of the control rod 21, supplementing a drive of the relay rod 12 (servo action). Likewise, when the control rod 21 is displaced to the right in FIG. 2, the rear wheels 2R and 2L are steered to the left in accordance with the amount of displacement of the control rod 21, while undergoing a servo action of the power cylinder 13 and supplying the liquid pressure to the chamber 13b of the power cylinder 13.

The front wheel steering mechanism A is provided with a power steering mechanism F is the rear wheel steering mechanism B with the power steering mechanism D. The power steering mechanism F has a power cylinder 65 mounted to the relay rod 5 of the front wheel steering mechanism A whose cylinder 65a is fixed to the vehicle body. The cylinder 65a is divided into two chambers 65b and 65c which are defined by a piston 65d which in turn is integral with the relay rod 5. The chambers 65b and 65c are connected through respective pipes 66 and 67 to a control valve 68 of a rotary type disposed on the shaft 8 of the steering mechanism C. To the control valve 68 are connected a pipe 70 and a pipe 71, the pipe 70 extending from a flow dividing valve 69 connected to the discharge side of the oil pump 20 and the pipe 71 being branched from the pipe 19 extending from the reservoir tank 17. The power steering mechanism F is designed so as to transmit an operating force of the steering wheel 9 to the relay rod 5 by means of a servo action (a servo action to be gained by supplying oil to the chamber 65b or 65c of the power cylinder 65), so that the action of the power steering mechanism F itself is basically the same as the power steering mechanism D. Hence, duplicate description will be omitted herefrom for brevity of explanation.

The steering mechanism C is associated with the rear wheel steering mechanism B through the front wheel steering mechanism A and the steering ratio altering system E. From the steering ratio altering system E extends an input rod 22 forwards, and its front end portion is provided with the pinion 23 which in turn is engaged with the rack 24 mounted to the relay rod 5 of the front wheel steering mechanism A. As an output rod of the steering ratio altering system E, there is used the input section 21a of the control rod 21 in the control valve 16, as described hereinabove. The steering ratio altering system E is well known to the state of art from the Japanese Patent Unexamined Publication (kokai) No. 152,977/1987 so that detailed description of this system will be omitted herefrom.

The rear wheel steering is controlled by a motor 44 for the steering ratio altering system E under instruction from a control unit 51 so as to perform a given steering ratio characteristic. This control is feedback control utilizing output from a sensor 45 for sensing an actual steering ratio, and the control unit 51 also functions as control over a mechanism for shifting a hydraulic pressure circuit H or I as will be described hereinafter.

The chambers 13b and 13c of the power cylinder 13 are provided with springs 13e and 13f, respectively, for biasing the rear wheels toward the neutral position. The biasing force of the springs 13e and 13f is set so as to retain the rear wheels in the neutral position in resistance to transverse acceleration caused during cornering, and the power cylinder 13 is designed so as to drive the relay rod 12 in resistance to this biasing force.

To hydraulic pressure pipes 18 and 19 for the rear wheels are connected to a circuit shifting mechanism H which will be described in more detail with reference to FIG. 3.

Figure 3:
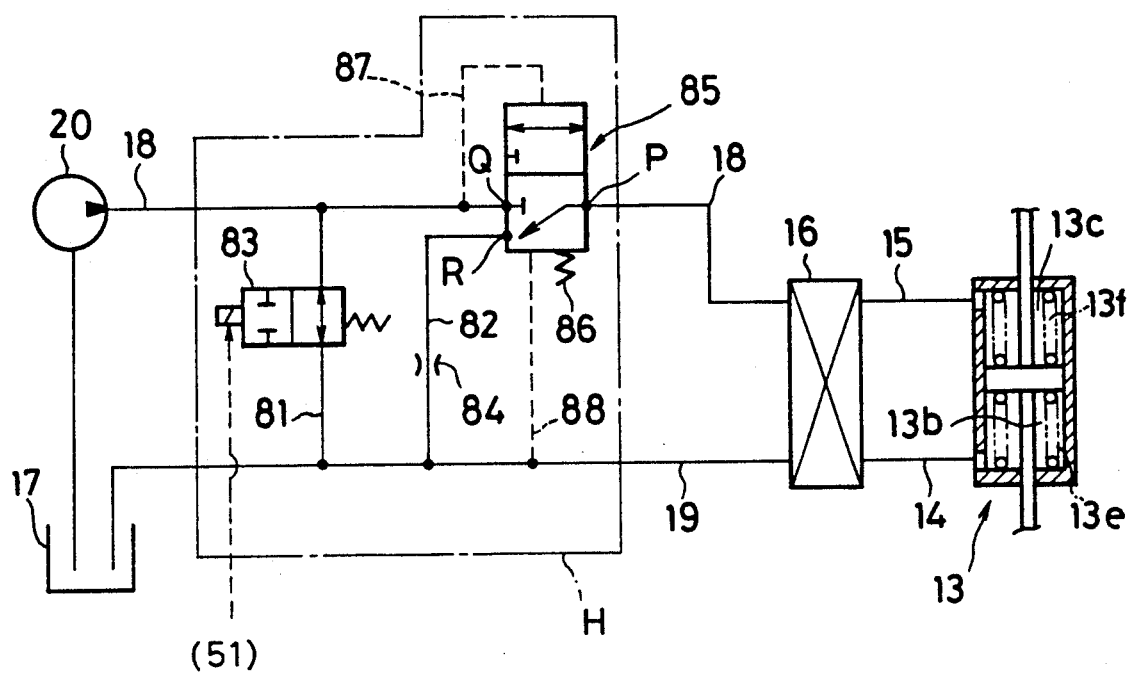
FIG. 3 is view showing a hydraulic circuit according to an embodiment of the present invention.

As shown in FIG. 3, the mechanism H has a first relief passage 81 and a second relief passage 82, each connecting the pipe 18 as a high pressure passage to the pipe 19 as a low pressure passage. The first relief passage 81 is disposed in parallel to the second relief passage 82. The first relief passage 81 constitutes a relief passage on the pump side which is disposed on the side closer to the pump 20, while the second relief passage 82 constitutes a relief passage on the power cylinder side which is disposed to the side closer to the control valve 16.

To the first relief passage 81 is connected an electromagnetic switching valve 83. To the second relief passage 82 is connected a restrictor 84. To the second relief passage 82 is further connected a 3-port/2-position shift valve 85 to which the pipe 18 in turn is connected. The shift valve 85 is biased by a spring 86 in a position as shown in FIG. 3, thereby dividing the pipe 18 into the side of the pump 20 (first relief passage 81) and the side of the valve 16 (second relief passage 82) and communicating the pipe 18 on the side of the valve 16 with the second relief passage 82. An equivalent circuit (the switching valve 83 being open) in the state of FIG. 3 is shown in FIG. 5.

Figure 6:
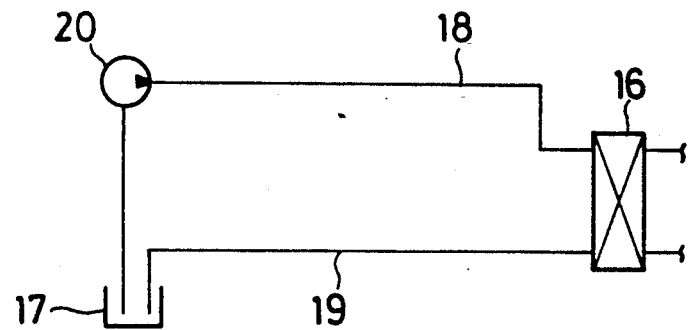

The shift valve 85 is displaced downwards in FIG. 3 in resistance to a biasing force of the spring 86 when the liquid pressure on the side of the pump 20 is applied through the pilot passage 87, thereby closing the second relief passage 82 and communicating the pump 20 with the valve 16. The equivalent circuit at this time (the switching valve 83 being closed) is shown in FIG. 6.

Figure 4:
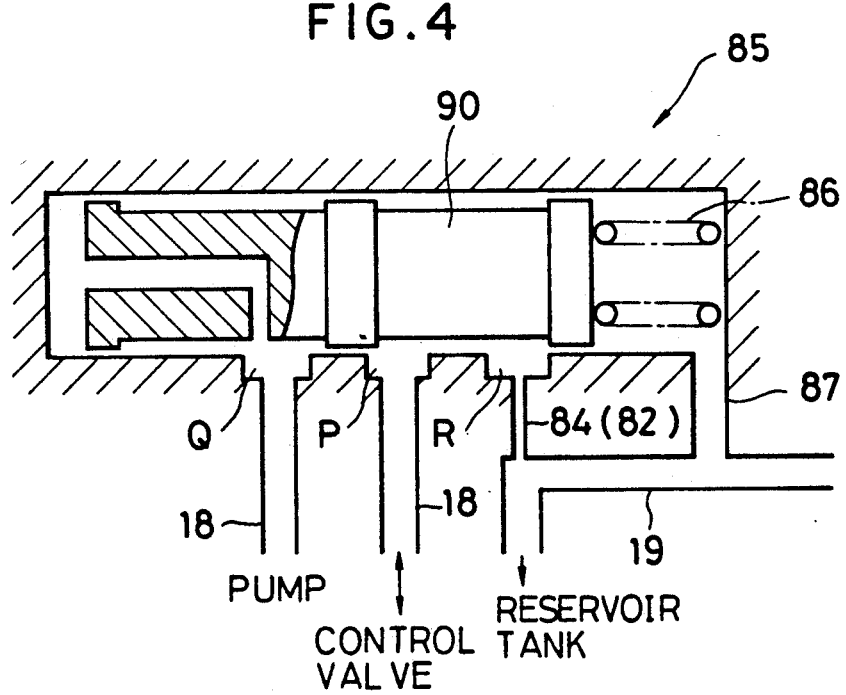
FIG. 4 is a view in section showing a specific embodiment of the shift valve of FIG. 3.
Figure 5:
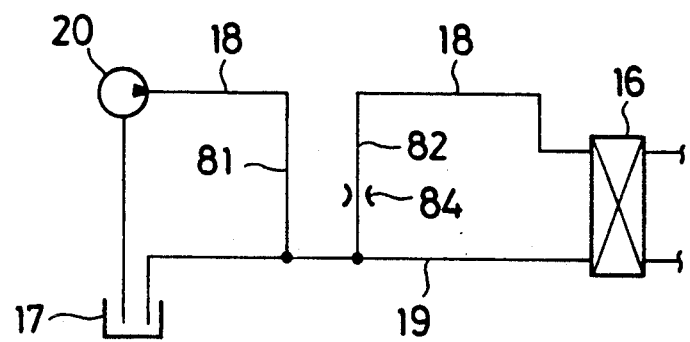
FIGS. 5 and 6 are each a view showing an equivalent circuit which can be taken by the hydraulic circuit of FIG. 3.

As a variant, an embodiment in which the shift valve 85 is of a spool type is shown in FIG. which shows the state corresponding to the state of FIG. 3 (FIG. 5). In FIG. 4, reference numeral 90 denotes a spool, and the other elements are provided with the same reference numerals as used in FIG. 3.

Figure 7:
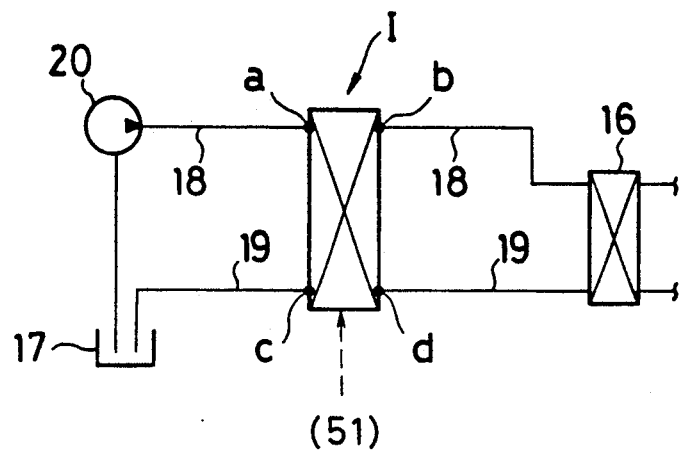
Figure 8:
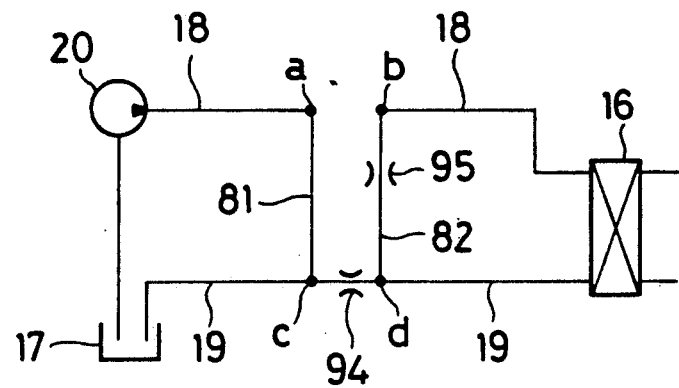
Figure 9:
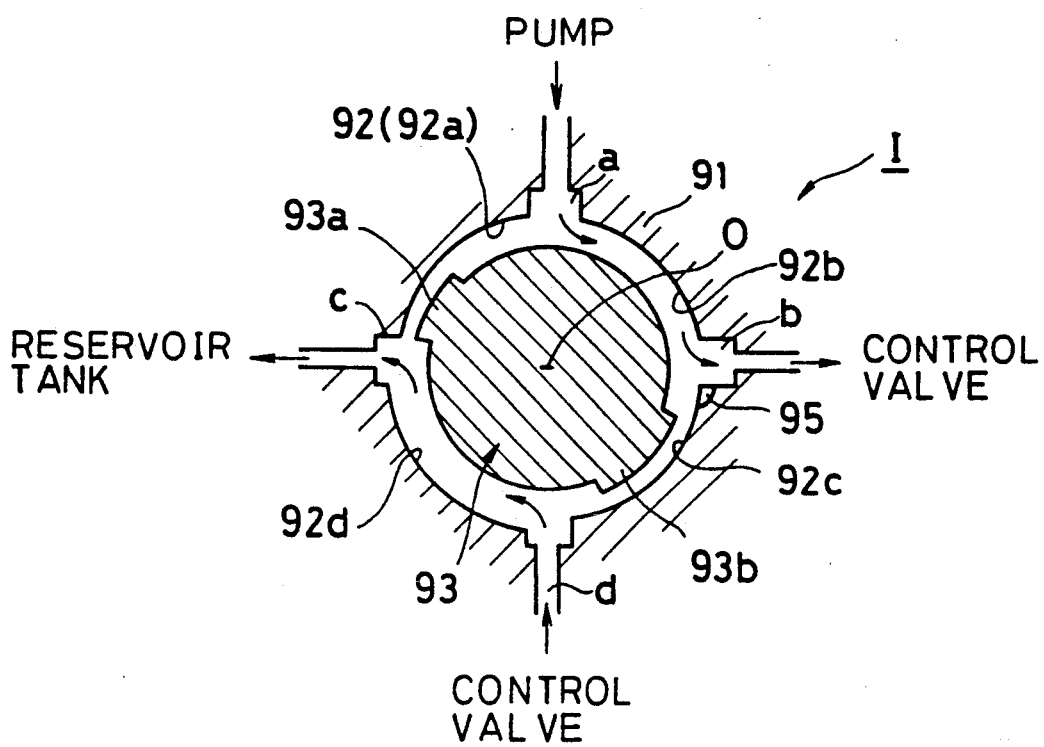
Figure 10:
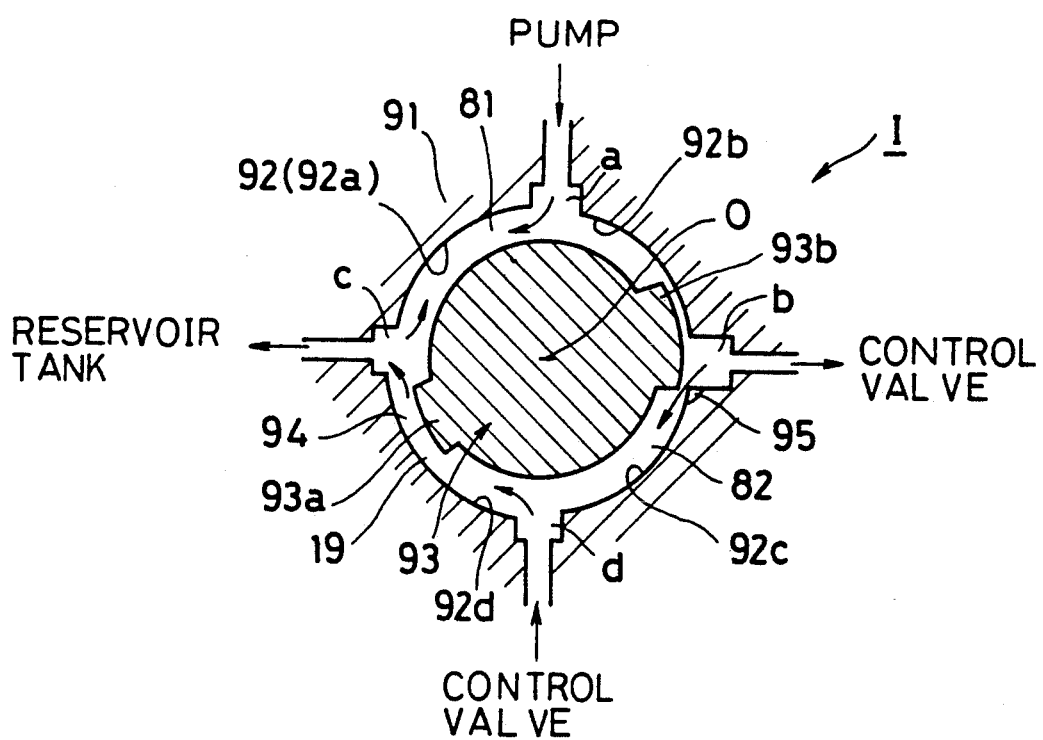

FIGS. 7 to 10 show another embodiment of the present invention and the same elements are provided with the same reference numerals as used in the previous embodiments. FIGS. 9 and 10 show the shifting mechanism of the rotary type comprising the switching valve 93 and the shift valve 85, in this embodiment, although the shifting mechanism may comprise one having the sole function as the shift valve 85.

A valve case 91 defines a valve chamber 92 within the case, and the valve chamber is of a nearly round shape in section and has four ports a, b, c and d to each of which are units and devices connected as shown in FIGS. 7 and 8. A cut-off portion 95 is formed on an opening end portion of the part b on the side of the port d, the cut-off portion constituting the restrictor. Of the inner peripheral surface of the valve chamber 92, an inner peripheral surface 92a between the port a and the port c, an inner peripheral surface 92b between the port a and the port b, and an inner peripheral surface 92c between the port b and the port d are disposed in an arc form of the identical diameter around the center O. On the other hand, an inner peripheral surface 92d of the valve chamber 92 between the port c and d is disposed in an arc shape of a larger diameter around the center O while three inner peripheral surfaces 92a to 92c are disposed in an arc form having a somewhat smaller diameter.

The valve body 91 of the rotary type is disposed in the valve chamber 92 so as to be rotatable around the center O and has two projections 93a and 93b. Outer peripheral surfaces of the projections 93a and 93b are formed in an arc shape around the center O. The valve body 93 may take a first position as shown in FIG. 9 and a second position as shown in FIG. 10.

As shown in FIG. 9, the first position of the valve body 93 is such that the projection 93a shuts a passage between the ports a and c off while the projection 93b shuts a passage between the ports b and d off, thereby allowing the port a to be communicated with the port b while communicating the port d with the port c. The equivalent circuit in the first position is the same as shown in FIG. 6.

In the second position as shown in FIG. 10, although the projection 93a is located in a position between the port c and the port d, a first restrictor is formed between the projection 93a and the inner peripheral surface 92d because the inner peripheral surface 92d has a diameter as large the diameter of the projection 93a, thereby communicating the port c with the port d. The projection 93b is located in such a position between the ports a and b to close the port b, thereby shutting a passage between the ports b and c a off. A cut-off portion 95 formed on an opening end of the port b serves as a second restrictor which in turn is allowed to be communicated with the port d. The equivalent circuit of FIG. 10 showing the second position is shown in FIG. 8. The valve body 93 as shown hereinabove is driven by means of the control unit 51.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A rear wheel steering system for a vehicle comprising:
   a power cylinder operatively connected to a rear wheel steering mechanism for generating a force for steering rear wheels in response to a liquid pressure, said power cylinder being connected through a high pressure passage to a pump which pumps a liquid as a source of generating liquid pressure and through a low pressure passage to a reservoir tank;
   a first relief passage disposed between and adapted to connect the high pressure passage and the low pressure passage;
   a second relief passage complete separate from said first relief passage along its length and disposed between and adapted to connect liquid from the power cylinder, and not the pump, with the low pressure passage; and
   passage shifting means for opening each of the first relief passage and the second relief passage during abnormal operation which is when a control mechanism for controlling the rear wheel steering mechanism breaks down, for closing the first relief passage and the second relief passage during normal operation, and for directing liquid such that when the first relief passage and the second relief passage are open, liquid in the high pressure passage coming from said power cylinder is gradually released through a restrictor means to the reservoir tank as it is passed to the low pressure passage through the second relief passage while preventing liquid in the high pressure passage from pressurizing the power cylinder.

2. A rear wheel steering system as claimed in claim 1, wherein the passage shifting means comprises a first shift valve disposed at a connection portion where the high pressure passage is connected to the second relief passage and a second shift valve disposed in the first relief passage;

the first shift valve is adapted to open and close the high pressure passage connection with the second relief passage; and the second shift valve is adapted to be operated in synchronization with the first shift valve to open and close the first relief passage so that the high pressure passage is selectively connected to the low pressure passage.

3. A rear wheel steering system as claimed in claim 2, wherein the first shift valve comprises a 3-port/2-position shift valve.

4. A rear wheel steering system as claimed in claim 2, wherein the first shift valve comprises a spool valve in which its movable valve body is displaceable in its axial direction.

5. A rear wheel steering system as claimed in claim 2, wherein the first shift valve comprises a rotary valve in which its movable valve body is pivotable.

6. A rear wheel steering system as claimed in claim 5, wherein the rotary valve is provided with a cut-off portion.

7. A rear wheel steering system as claimed in claim 6, wherein the rotary valve functions as the first shift valve and the second shift valve.

8. A rear wheel steering system as claimed in claim 1, wherein the power cylinder is provided with a biasing means for biasing the rear wheels toward a neutral position.

9. A rear wheel steering system as claimed in claim 8, wherein the power cylinder comprises a cylinder main body, and a piston inserted in the cylinder main body and disposed so as to divide the cylinder main body into two chambers;

the cylinder main body is fixed to a body of the vehicle; and the piston is mounted integrally with a relay rod which functions as an element of the rear wheel steering mechanism.

10. A rear wheel steering system as claimed in claim 9, wherein the biasing means comprises two compressive springs, one of the compressive springs being provided in one chamber in the cylinder main body and the other being provided in another chamber therein.

11. A rear wheel steering system as claimed in claim 10, wherein the rear wheel steering mechanism comprises the relay rod, a tie rod disposed at each end of the relay rod and a knuckle arm pivotable by the tie rod.

12. A rear wheel steering system as claimed in claim 11, wherein the rear wheel steering mechanism is associated with a steering mechanism for steering front wheels through a front wheel steering mechanism.

13. A rear wheel steering system as claimed in claim 12, wherein the rear wheel steering mechanism is mechanically associated with the front wheel steering mechanism.

14. A rear wheel steering system as claimed in claim 13, wherein a steering ratio altering means is interposed between the rear wheel steering mechanism and the front wheel steering mechanism, the steering ratio altering means being for adjusting a ratio of a steered angle of the rear wheel to a steered angle of a front wheel in accordance with a running state of the body of the vehicle.

15. A rear wheel steering system as claimed in claim 1, further comprising a restrictor provided in said second relief passage.

* * * * *